US006367989B1

(12) United States Patent
Hartman et al.

(10) Patent No.: US 6,367,989 B1
(45) Date of Patent: Apr. 9, 2002

(54) OPTICAL INTERCONNECT METHOD AND APPARATUS

(75) Inventors: Davis Howard Hartman; Norbert Kleiner; Douglas Roy Tomren, all of Scottsdale; Keith Vaclav Warble, Chandler, all of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/575,514

(22) Filed: May 22, 2000

(51) Int. Cl.[7] .................................................. G02B 6/36
(52) U.S. Cl. ........................ 385/89; 385/24; 385/115; 385/116; 359/189; 359/123
(58) Field of Search ............................. 385/89, 24, 115, 385/33, 116, 120, 121; 359/125, 173, 152, 189

(56) References Cited

U.S. PATENT DOCUMENTS 5,861,965 A * 1/1999 Koren et al. ................ 359/123

OTHER PUBLICATIONS

An article entitled, "Interconnection of a two–dimensional array of verticle–cavity surface–emitting lasers to a receiver array by means of a fiber image guide", by Tomasz Maj. Andrew G. Kirk, David V. Plant, Joseph F. Ahadian, Clifton G. Fonstad, Kevin L. Lear, Karim Tatah, Matthew S. Robinson, and John A. Trezza, from Applied Optics, vol. 39, No. 5, Feb. 10, 2000.

An article entitled, "Multichannel Optical Interconnections using Imaging Fiber Bundles" by Donald M. Chiarulli, Steven P. Levitan, Paige Derr, Raju Menon, and N. Wattanapongsakorn, University of Pittsburg, Pittsburg, PA 15260, Bryan Greiner and Matt Robinson, Schott Fiber Optics, 122 Charlton St., Southbridge, MA 01550–1960.

An artical entitled, "Performance Measurements of Fiber Imaging Guides and Fiber Bundles in Optical Interconnect Applications", by Karim Tatah, David Filkins, Bryan Greiner, and Matthew Robinson, Schott Fiber Optics, Inc., 122 Charlton Street, Southbridge, MA 01550–1960.

An article entitled, "Demonstration Of A Multichannel Optical Interconnection By Use Of Imaging Fiber Bundles Butt Coupled To Optoelectronic Circuits", by Donald M. Chiarulli, Steven P. Levitan, Paige Derr, Robert Hofmann, Bryan Greiner, and Matt Robinson from Applied Optics/vol. 39, No. 5/10 Feb. 2000.

An article entitled "Demonstration of a multichannel optical interconnection by use of imaging fiber bundles butt coupled to optoelectronic circuits", by Donald M. Chiarulli, Steven P. Levitan, Paige Derr, Robert Hofmann, Bryan Greiner, and Matt Robinson, from Applied Optics/vol. 39, No. 5/10 Feb. 2000.

* cited by examiner

Primary Examiner—Phan T. H. Palmer
(74) Attorney, Agent, or Firm—Frank J. Bogacz (57) ABSTRACT

An optical interconnect system (100) includes an array of optical sources (102), a high-density fiber bundle (110), and an array of optical receivers (150). The density of the fiber bundle is such that each optical source (104) couples light to multiple fibers within the bundle. The fiber bundle has a consistent cross section along its length so that the footprint of fibers (306, FIG. 3) illuminated by a spot (304) from an optical source illuminates a similar footprint (404, FIG. 4) over the optical receivers (406). The optical receiver array has a density of optical receivers such that the footprint of fibers corresponding to a single optical source illuminates at least one optical receiver. A method (600, FIG. 6) for creating optical source/receiver pairs excites each optical source in turn and detects energy at the optical receiver array.

20 Claims, 5 Drawing Sheets

OPTICAL INTERCONNECT METHOD AND APPARATUS

FIELD OF THE INVENTION

The present invention relates generally to optical interconnect systems and, in particular, to optical interconnect systems that create more than one optical link.

BACKGROUND OF THE INVENTION

Many modern systems benefit from optical interconnect systems. Optical interconnects can carry a large amount of information and operate very fast. One known mechanism for making optical interconnects involves coupling a laser light source to an optical fiber. The laser light source emits light that travels through the fiber to be received at the other end.

Efficient coupling from the laser light source to the fiber is achieved when the fiber is very well aligned with the laser light source. Often, the tolerance of the alignment is on the order of one micron. Manufacturing optical interconnects with these tight manufacturing tolerances can be very expensive, in part because connectors capable of achieving the tight tolerances are expensive.

Traditionally, when multiple optical links are created, one fiber is attached at a time. As the number of optical links increases, the manufacturing time and expense also increases. In addition, the manufacturing yield can suffer when fibers break or become misaligned.

Accordingly, a significant need exists for a method and apparatus for providing optical interconnects with larger manufacturing tolerances.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and wherein:

DETAILED DESCRIPTION OF THE DRAWINGS

In the following detailed description, reference is made to the accompanying drawings that show, by way of illustration, specific embodiments in which the invention may be practiced. It is to be understood that other embodiments may be utilized and structural changes may be made without departing from the scope of the present invention.

The method and apparatus of the present invention provide an efficient mechanism to generate optical interconnection cables and systems having relaxed tolerance requirements. A high-density fiber bundle couples an array of optical sources with an array of optical receivers. The number of fibers in the fiber bundle is large as compared to the number of optical sources, such that light from any given optical source reliably couples light to more than one fiber. In addition, the number of optical receivers is greater than the number of optical sources, such that light emerging from fibers corresponding to any given optical source reliably couples to at least one optical receiver to create optical source/receiver pairs, and in one embodiment the light emerging from fibers corresponding to any given optical source reliably couples to more than one optical receiver.

The optical source/receiver pairs are determined using a method that can detect energy at each of the optical receivers. As a result, larger manufacturing tolerances are gained at both the source and receive end of the optical interconnect. With larger allowable tolerances, optical interconnects can be made more reliably and inexpensively.

Figure 1:
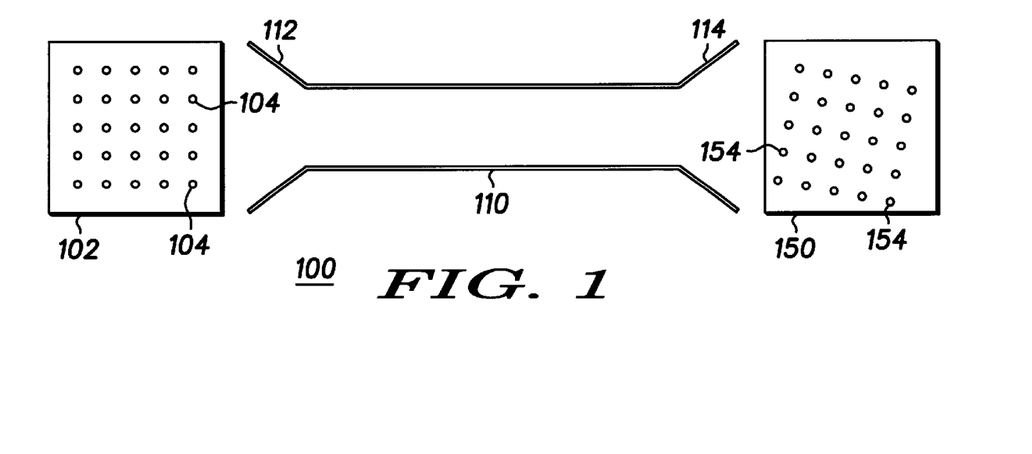
FIG. 1 shows a diagram of an optical interconnect system in accordance with a preferred embodiment of the present invention.
Figure 2:
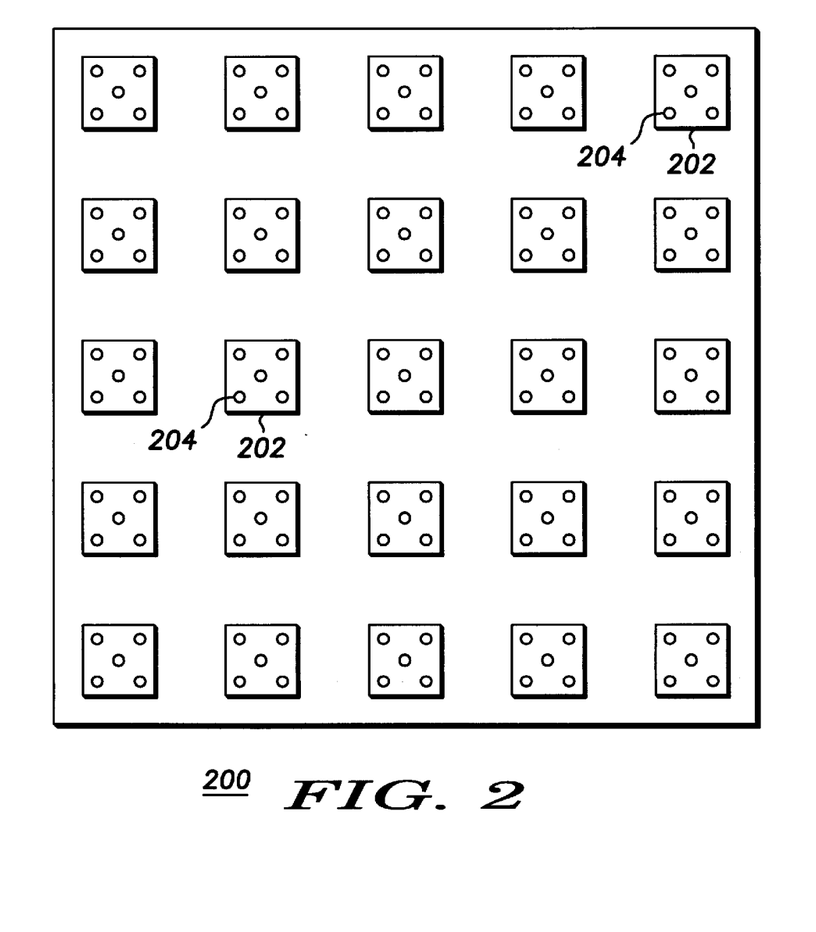
FIG. 2 shows an array of optical sources in accordance with a preferred embodiment of the present invention.
Figure 3:
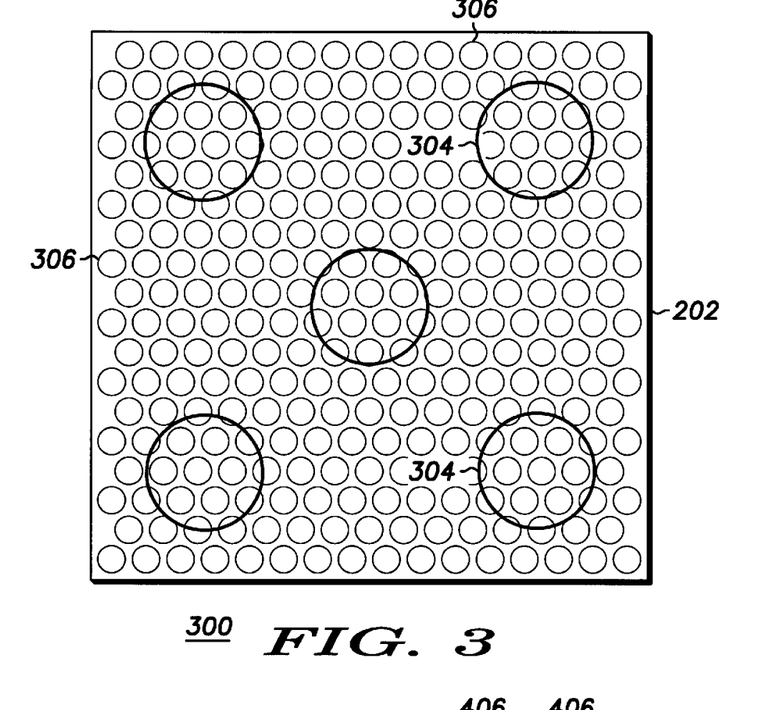
FIG. 3 shows an optical source spot footprint on a fiber bundle in accordance with a preferred embodiment of the present invention.
Figure 4:
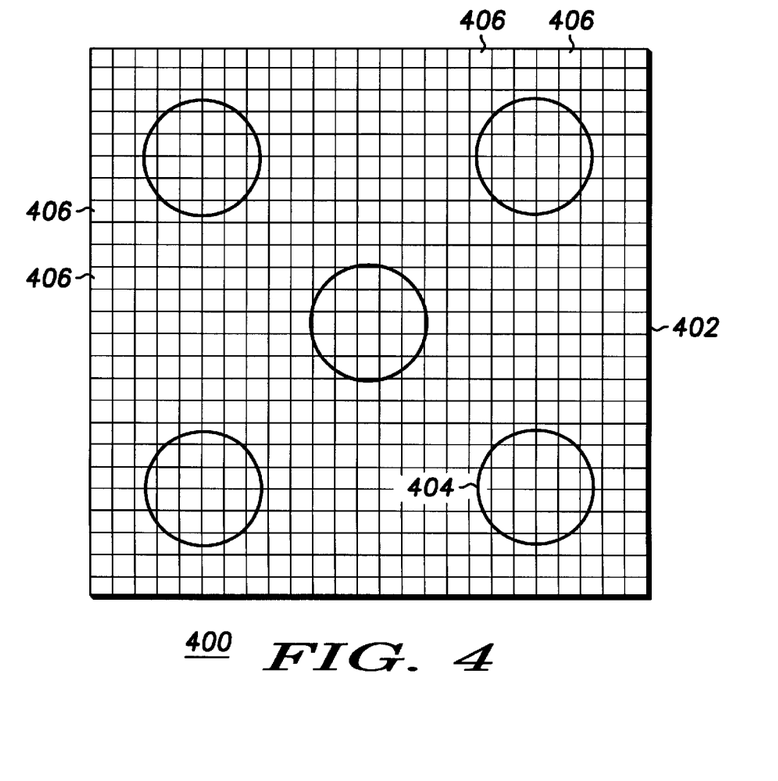
FIG. 4 shows an optical source spot footprint on an array of optical receivers in accordance with a preferred embodiment of the present invention.

Turning now to the drawings in which like reference characters indicate corresponding elements throughout the several views, attention is first directed to FIG. 1. FIG. 1 shows an optical interconnect system 100 in accordance with a preferred embodiment of the present invention. It will be understood that FIG. 1, as well as FIGS. 2–4, are not drawn to scale, and that certain dimensions therein may be exaggerated or minimized to better illustrate embodiments of the invention. Interconnect system 100 includes optical source array 102, fiber bundle 110, and optical receiver array 150. Optical source array 102 includes an array of optical sources 104. Optical sources 104 can be any type of optical source capable of coupling light to an optical fiber. In a preferred embodiment, optical sources 104 are laser diodes, and optical source array 102 is an integrated circuit manufactured using Vertical Cavity Surface Emitting Laser (VCSEL) technology. Optical source array 102 is shown in FIG. 1 as a rectangular array with regular spacing between optical sources, but this is not a requirement. Any shape of array can be used, as can irregular spacing between optical sources 104.

Fiber bundle 110 is a high-density bundle of optical fibers having more fibers than the number of optical sources 104 in optical source array 102, such that each optical source 104 couples light to a plurality of fibers. In a preferred embodiment, fiber bundle 110 is a fiber bundle commonly used in medical imaging applications, having on the order of 20,000 fibers, and it is commercially available from Schott Glass, for example. Fiber bundle 110 can be any length, and it includes a first end 112 and a second end 114. End 112 of fiber bundle 110 is coupled to optical source array 102 such that each optical source 104 couples light to more than one fiber in fiber bundle 110.

Fibers within fiber bundle 110 are preferably arranged such that the relative placement of fibers along the length of fiber bundle 110 does not substantially change. In other words, the cross section of fibers is the same along the length of fiber bundle 110. For example, the fibers in a cross section of fibers exposed at end 112 have a placement relative to each other. In an embodiment where the relative placement does not change along the length of fiber bundle 110, fibers exposed at a cross section of fiber bundle 110 at end 114 have substantially the same placement relative to each other.

When optical interconnect system 100 is manufactured, ends 112 and 114 of fiber bundle 110 are polished and positioned close to optical source array 102 and optical receiver array 150 using array connectors (not shown). In a preferred embodiment, the array connectors are used to couple fiber bundle 110 to the optical source array 102 and optical receiver array 150 such that the ends of the fibers are about 50–75 microns away from the arrays.

Optical receiver array 150 includes optical receivers (not shown), and it is shown having a plurality of spots 154 projected thereon. In a preferred embodiment, the optical receivers include photodiodes capable of detecting laser light, and the optical receivers further include amplifiers to generate signals from the light. A diagram including both spots and optical receivers is shown below in FIG. 4.

Each of spots 154 in FIG. 1 represents light corresponding to a single optical source 104 projected onto optical receiver array 150. The light emitted from optical sources 104 create an image. The image is composed of discrete areas of light from optical source array 102, and the relative positions of the discrete areas of light are maintained throughout the length of the fiber bundle, and they emerge onto the receiver array as an image. Spots 154 retain their relative positions as an image, but they are not positioned relative to anything else with any great precision. The image emerging from the fiber bundle at end 114 is shown as misaligned and rotated relative to optical receiver array 150 to illustrate that the method and apparatus of the present invention allow optical interconnect system 100 to tolerate misalignment. In the embodiment shown in FIG. 1, the array connectors have been connected such that spots 154, when projected on optical receiver array 150, are not aligned with anything in particular.

The method and apparatus of the present invention allow for the use of low-cost array connectors that may not align the same way each time they are mated. Every time the connection between an array and an end of the fiber bundle is made, the alignment is not the same. The method and apparatus allow optical interconnect system 100 to tolerate misalignment, and as a result, they allow for the use of low-cost array connectors.

FIG. 2 shows an array 200 of optical sources in accordance with a preferred embodiment of the present invention. Optical source array 200 is a 5×5 array of laser sites 202, each laser site 202 having five lasers 204. In a preferred embodiment, each laser 204 is a VCSEL. VCSEL technology allows many lasers to be manufactured on a monolithic substrate. In one embodiment, each laser 204 within optical source array 200 is used to create an optical link, for a total of 125 optical links. In a preferred embodiment, however, a subset of lasers 204 is used for optical links, and the others are used for spares. For example, one laser 204 within each laser site 202 can be used to create an optical link. If the link should fail, another laser 204 can be substituted for the one experiencing the failure. In another embodiment, more than one laser 204 in each laser site 202 is used at a time to transmit the same information, and the information is combined at the receiver end. These are examples of how the method and apparatus of the present invention provide fault tolerance and redundancy. Mechanisms for swapping in spare lasers are described below with reference to the remaining figures.

While optical source array 200 is shown as a 5×5 array of laser sites 202, each having five lasers 204, in other embodiments array sizes are larger or smaller, and the number of lasers 204 at each laser site 202 is different than five. For example, in one embodiment, a 10×10 array is used with a single laser at each site for a total of 100 lasers. In another embodiment, a 2×2 array of laser sites is used with 16 lasers at each site for a total of 64 lasers. In the embodiment shown in FIG. 2, laser sites 202 are 200 microns wide and are 400 microns on center, for a total array size of 2200 microns on a side. In this embodiment, each laser 204 is approximately ten microns wide. These dimensions are exemplary and are not meant to be limiting in any way.

FIG. 3 shows an optical source spot footprint 300 on a fiber bundle in accordance with a preferred embodiment of the present invention. Footprint 300 shows a cross section of a fiber bundle as fiber footprints 306. Footprint 300 also shows an outline of laser site 202 superimposed on fiber footprints 306. Fiber footprints 306 correspond to the cross section of fibers at end 112 of fiber bundle 110 (FIG. 1) that spatially intersect with laser site 202.

Spots 304 correspond to light projected onto end 112 of fiber bundle 110 from lasers 204. Spots 304 are somewhat larger than the size of lasers 204, in part because the light from the laser diffracts while traveling from optical source array 200 through air or other transmission medium between lasers 204 and end 112 of fiber bundle 110 into a different transmission medium of the polished fibers in the fiber bundle 110. In a preferred embodiment where lasers 204 are ten microns wide and end 112 of fiber bundle 110 is 50–75 microns away from lasers 204, spots 304 are about 25–30 microns wide.

Because fibers having footprints 306 are small and numerous in comparison to the size of spots 304, light from each optical source 104 couples to many fibers. The fibers that receive light from any particular optical source correspond to a subset of the total number of fibers in fiber bundle 110 (FIG. 1). The particular subset of fibers that couple to any given optical source depends on the alignment of end 112 of fiber bundle 110 and the optical source array. For example, when optical fiber bundle 110 is coupled to optical source array 200, footprint 300 results. If the alignment of optical fiber bundle 110 is changed; that is, if the group of fiber footprints 306 is translated and/or rotated relative to laser site 202, each spot 304 will couple light to a different subset of fibers. Even though any particular optical source 104 may couple light to a different subset of fibers, some number of optical fibers are always substantially aligned with each optical source 104, and each optical source reliably couples light thereto.

FIG. 4 shows an optical source spot footprint 400 on an array of optical receivers in accordance with a preferred embodiment of the present invention. Footprint 400 includes optical source spot footprints 404 superimposed on optical receiver array 402. Spots 404 are projected onto optical receiver array 402 from the fibers at end 114 of fiber bundle 110. In a preferred embodiment, in which spots 304 (FIG. 3) are about 20–25 microns in diameter, spots 404 are about 50–60 microns in diameter. The increase in spot size is due to the diffraction of the light as it travels from the transmission medium of the fiber bundle 110 out the polished fiber ends into a different transmission medium (e.g. air) into receiver array 400.

The image (relative placement) of spots 404 is substantially the same as the image created by the optical sources and projected onto the fiber bundle as shown in FIG. 3. This is because the fiber bundle has a consistent cross section along its length such that when light is coupled to a plurality of fibers having a substantially constant relative placement within the fiber bundle, the light is emitted from the other end of the fiber bundle having the same relative placement.

In a preferred embodiment, optical receivers 406 include photodiodes capable of detecting light, and they also include electronics components to amplify signals. Also in a preferred embodiment, optical receivers 406 occur in greater numbers than, and are arranged more densely than, optical sources 104 in optical source array 102. Photodiodes and electronics are commonly manufactured for use in charge coupled device (CCD) arrays for use in imaging applications. Each photodiode corresponds to one pixel on a display. As shown in FIG. 4, optical receivers are spaced approximately 10 microns on center. Photodiodes can be manufactured at these densities using known processes. For example, Image Metal Oxide Semiconductor (IMOS) technology can be used to make photodiodes 10–15 microns in diameter. In an embodiment in which spots 404 are 50 microns wide, it can be seen that each optical source will couple light to more than one optical receiver. In a preferred embodiment, each spot 404 couples light to 20–30 optical receivers 406.

As stated above, when misalignment occurs, any given optical source is coupled to different ones of optical receivers 406. Depending on whether the misalignment occurs at one or both ends of the fiber bundle, the light emitted from any given optical source may travel through the same or a different subset of fibers. Misalignment notwithstanding, each optical source always couples light to at least one fiber, which in turn couples light to at least one optical receiver, creating optical source/receiver pairs. Depending on the degree of misalignment, the optical source/receiver pairs can change each time an array connector is mated or de-mated. The method and apparatus of the present invention tolerate misalignment, and the optical source/receiver pairs are determined each time the optical interconnect is made.

FIGS. 3 and 4 have been presented as exemplary embodiments, and they have been explained in a context where every laser in a laser site emits light and projects spots onto the fiber bundle and onto the receiver array. In embodiments where some lasers are kept as spares, not all spots will be illuminated simultaneously. Instead, only those lasers that are active project spots as explained above.

As previously described, an optical interconnect system such as optical interconnect system 100 (FIG. 1) can be built by coupling an array of optical sources to one end of a fiber bundle, and by coupling an array of optical receivers to the other end of the fiber bundle. When this is performed without tight tolerances, each optical source couples to one or more optical receivers to create source/receiver pairs in an unpredictable fashion. That is to say, it may not be known which of receivers 406 corresponds to each optical source 104. The circuit as described with reference to FIG. 5 below allows the selection of optical source/receiver pairs.

Figure 5:
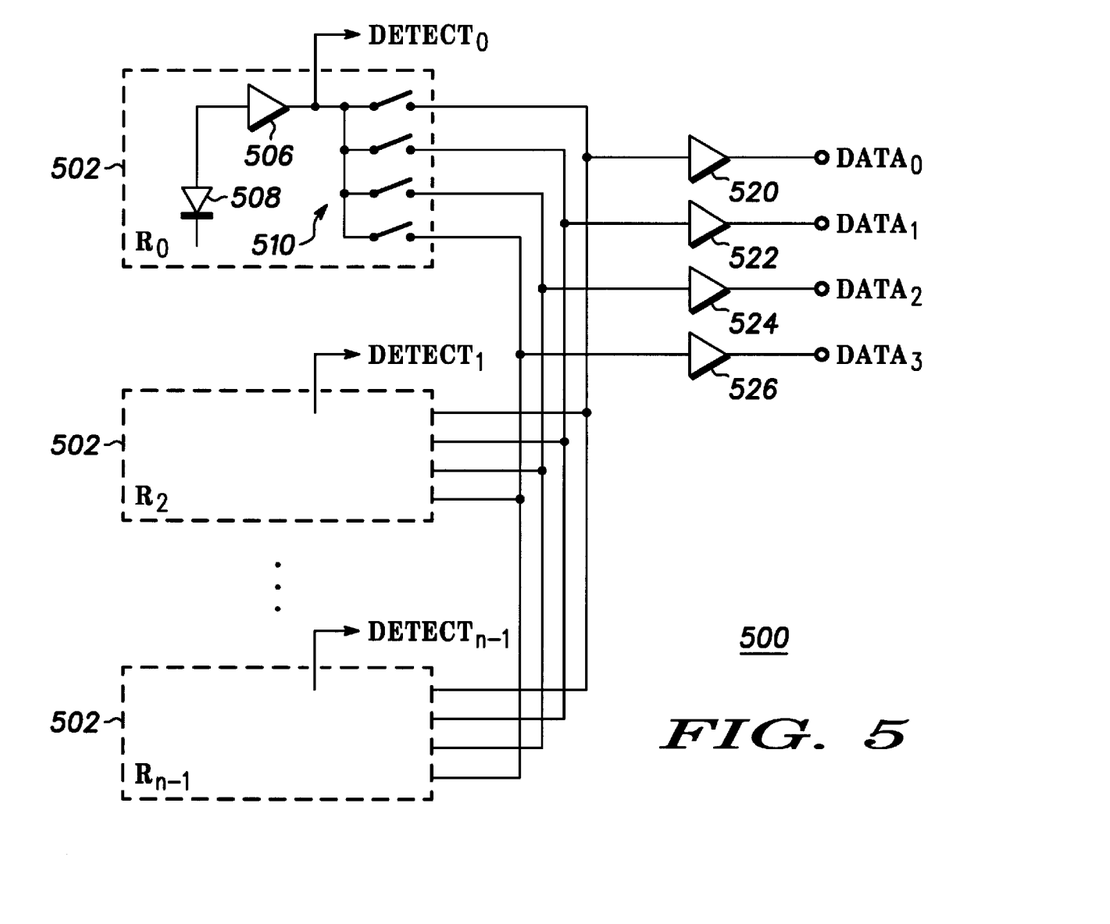
FIG. 5 shows a pixel selection circuit in accordance with a preferred embodiment of the present invention.

FIG. 5 shows a pixel selection circuit 500 in accordance with a preferred embodiment of the present invention. Pixel selection circuit 500 includes a plurality of detector circuits 502 and drivers 520, 522, 524, and 526. In the embodiment of FIG. 5, four data lines exist, and "n" optical receivers exist. This corresponds to an optical source array sending four different data streams and an optical receiver array having "n" receiver sites. Each of the four different data streams can be sent by a single optical source, or each can be sent by multiple optical sources for redundancy. As a result, four or more optical sources can be utilized in the embodiment of FIG. 5. As is explained more fully below, pixel selection circuit 500 can sum the outputs of multiple detector circuits 502 and produce four data outputs from any number of inputs.

Detector circuits 502 each include an optical receiver 508, an amplifier 506, and a plurality of switches 510. In a preferred embodiment, optical receiver 508 is a photodiode, and switches 510 are field effect transistors (FETs). Switches 510 are independently controlled by control signals on control lines (not shown) entering each detector circuit 502. Each detector circuit 502 preferably includes a number of switches 510 equal to the number of data lines, such that any of the "n" optical receivers can be coupled to any of the data lines. This is the "pixel selection" performed by pixel selection circuit 500. In embodiments having very large arrays, however, it may be desirable to partition the array of optical receivers such that areas of the optical receiver array can only couple to a subset of the total number of data lines. In these embodiments, the area consumed by switches 510 is decreased.

Each detector circuit 502 also includes a "detect" output 504. When optical receiver 508 is receiving light, an indication thereof is present on detect output 504. Detect output 504 on each of detector circuits 502 is advantageously used to produce source/receiver pairs.

In a preferred embodiment, detect circuit 500 is included in an Application Specific Integrated Circuit (ASIC) that is coupled to a processor. The processor is capable of sampling detect output 504 and setting switches 510. As a result, any of the data outputs can be coupled to any optical receiver through the action of the processor.

FIG. 5 shows four data lines, but any number can exist. For example, in an embodiment that produces 100 optical links, circuit 500 includes 100 data output lines. Any data output line can be coupled to any single detector circuit 502, or it can be coupled to any number of detector circuits 502. For example, in an embodiment that couples an optical source to a single optical receiver, a single detector circuit 502 is coupled to a data output. In an embodiment that couples an optical source to a plurality of optical receivers, multiple detector circuits 502 can be wire-ORed by closing the appropriate switches.

Figure 6:
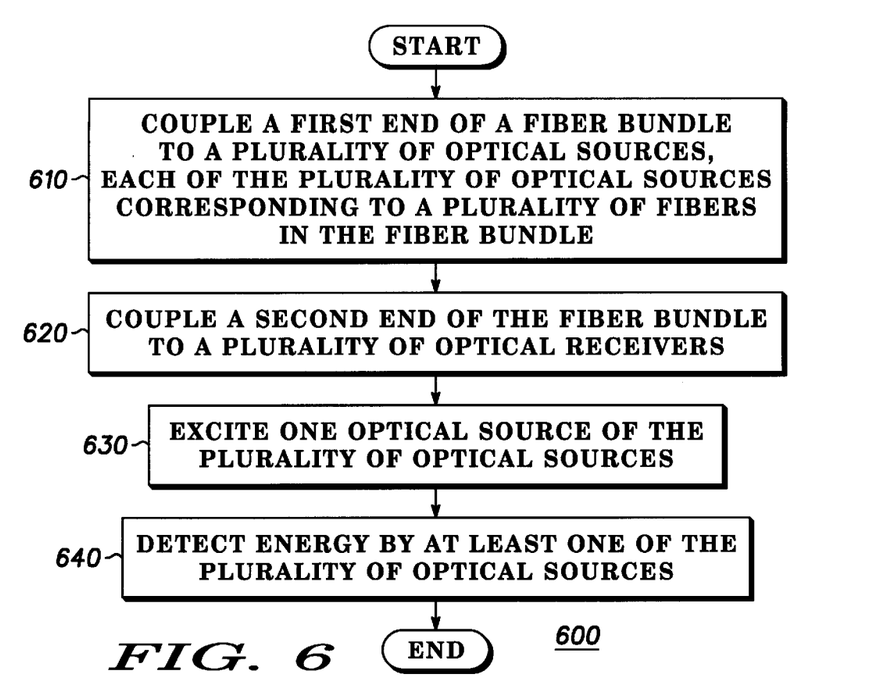
FIG. 6 is a flowchart of a method for performing an optical interconnect in accordance with a preferred embodiment of the present invention.

FIG. 6 is a flowchart of a method 600 for performing an optical interconnect in accordance with a preferred embodiment of the present invention. Method 600 begins in block 610 when a first end of a fiber bundle is coupled to a plurality of optical sources. One embodiment of this is illustrated in FIG. 1, which shows end 112 of fiber bundle 110 being coupled to optical sources 104. Each of the optical sources corresponds to a plurality of fibers in the fiber bundle. One embodiment of this is illustrated in FIG. 3 which shows a plurality of fiber footprints 306 intersecting with an optical source spot 304.

Method 600 continues in block 620 when a second end of the fiber bundle is coupled to a plurality of optical receivers. An embodiment of this is illustrated in FIG. 1 which shows end 114 of optical fiber bundle 110 being coupled to optical receiver array 150. In a preferred embodiment, the number of optical receivers is greater than the number of optical sources referred to in block 610. Also in a preferred embodiment, the density of optical receivers is such that each plurality of fibers corresponding to an optical source illuminates at least one optical receiver.

In block 630, one optical source of the plurality of optical sources is excited such that it emits light. The excitation of the optical source can be any form of excitation that causes light to be emitted. For example, a beacon signal, a modulated signal, or a light pulse can be transmitted. In block 640, each of the plurality of optical receivers is monitored to detect energy. This can be accomplished by monitoring a detect output 504 (FIG. 5). Any optical receivers having a detected energy level above a threshold are logged as corresponding to the optical source excited in block 630. In a preferred embodiment, where the density of optical receivers is such that more than one optical receiver receives light from each optical source, any of the illuminated optical receivers can be chosen to complete the optical link, and the rest can be used as spares for redundancy. When one is chosen, an optical source/receiver pair is determined. When more than one optical receiver is chosen, a one-to-many optical source/receiver relationship is created.

In a preferred embodiment, the actions shown in blocks 630 and 640 are repeated for every optical source in the plurality of optical sources. When this has been accomplished, an optical source/receiver pair exists for each optical source.

The method and apparatus of the present invention allow the optical interconnect system to be reconfigured at any time to compensate for broken fibers, diagnostics, link monitoring, and the like. For example, if as a result of method 600 an optical source/receiver pair is generated, and during operation the link breaks, any of the spare optical receivers corresponding to the optical source of interest can be substituted. This is an example of fault-tolerance created through the redundancy generated by the density of the optical receivers.

Figure 7:
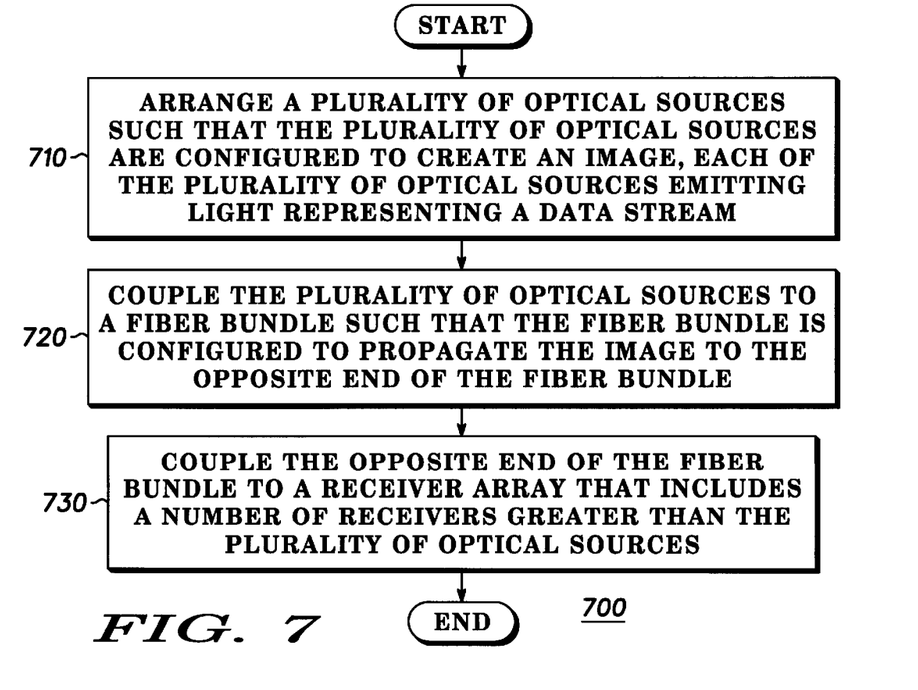
FIG. 7 is a flowchart of a method for coupling optical sources to optical receivers in accordance with a preferred embodiment of the present invention.

FIG. 7 is a flowchart of a method 700 for coupling optical sources to optical receivers in accordance with a preferred embodiment of the present invention. Method 700 begins in block 710 when a plurality of optical sources is arranged such that they are configured to create an image. The image includes light representing a data stream from each optical source. In block 720, the plurality of optical sources are coupled to a fiber bundle such that the fiber bundle is configured to propagate the image to the opposite end of the bundle. The fiber bundle is preferably one that maintains a constant cross section along the length of the fiber bundle, such that the image is substantially the same at both ends of the fiber bundle.

In block 730, the opposite end of the fiber bundle is coupled to an optical receiver array, such as optical receiver array 400 (FIG. 4). The receiver array of block 730 is preferably a receiver array having a number of receivers greater than the number of optical sources referred to in block 710. As a result, each optical source couples to at least one optical receiver.

Figure 8:
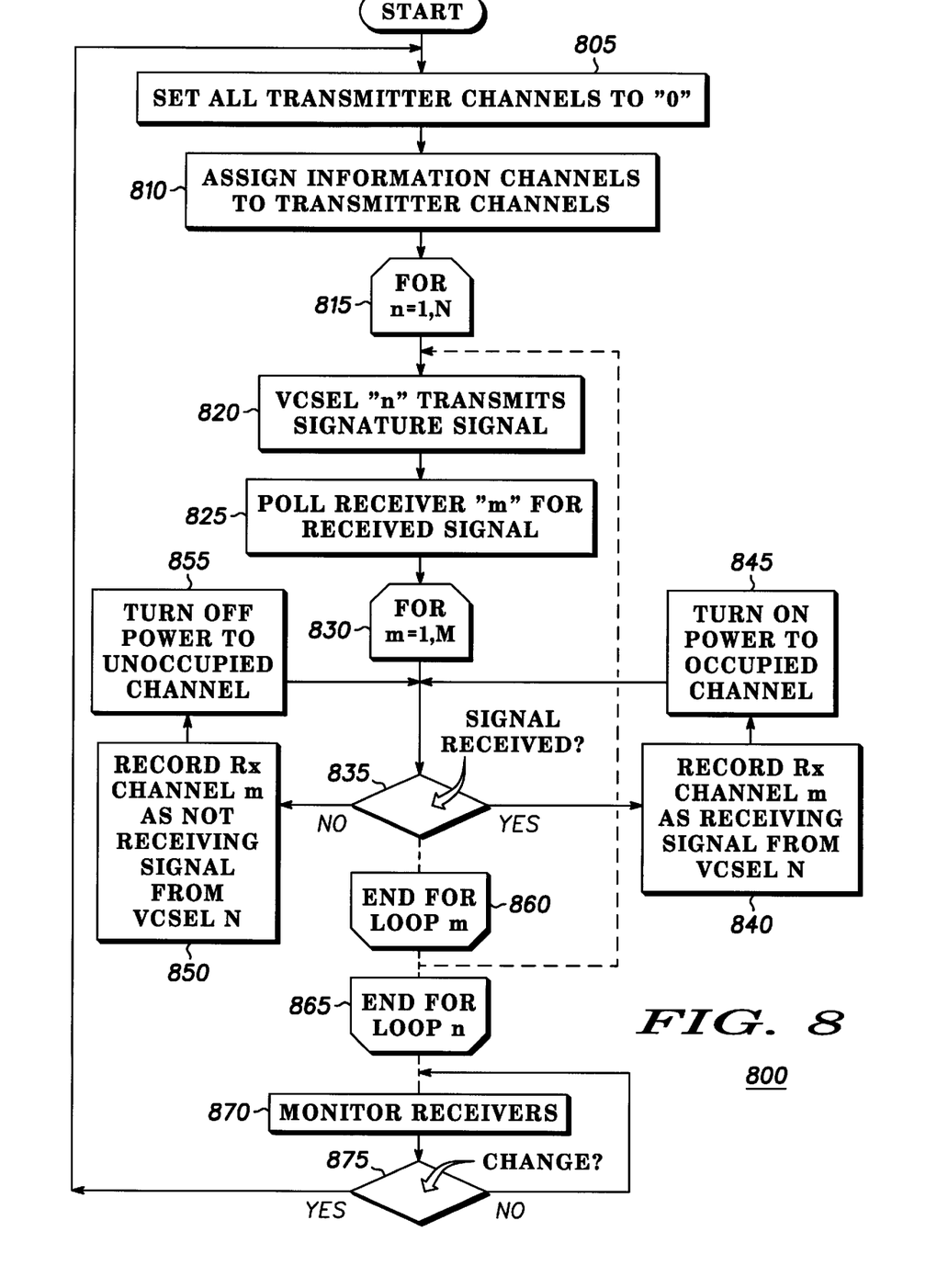
FIG. 8 is a flowchart of a method for configuring and re-configuring optical links in accordance with a preferred embodiment of the present invention.

FIG. 8 is a flowchart of a method 800 for configuring and re-configuring optical links in accordance with a preferred embodiment of the present invention. Method 800 begins in block 805 when all transmitter channels are set to zero. Setting transmitter channels to zero corresponds to logically decoupling transmitter channels and receiver channels. In block 810, information channels are assigned to transmitter channels. Information channels are logical channels that carry information. The action of block 810 assigns logical channels to physical transmitter channels.

Block 815 marks the beginning of a "FOR" loop, the end of which is marked by block 865. The actions between blocks 815 and 865 are repeated once for each transmitter channel receiving an assignment in block 810. In the example of FIG. 8, there are "N" such channels, and the actions between blocks 815 and 865 are repeated "N" times, once for each transmitter channel. In block 820, a signature signal is transmitted in a transmitter channel. In a preferred embodiment, the transmitter channel corresponds to a vertical cavity surface emitting laser (VCSEL) that is part of an array of such lasers. In this embodiment, a separate VCSEL transmits a signature signal for each traversal of the FOR loop marked by blocks 815 and 865.

In block 825, each receiver is polled for a received signal. This is shown in more detail in the FOR loop bounded by blocks 830 and 860. The actions between blocks 830 and 860 are repeated once for each receiver in an array of receivers. In a preferred embodiment, the array of receivers is an array of photodiodes. In the example of FIG. 8, there are "M" such photodiodes, and the actions between blocks 830 and 860 are repeated "M" times, once for each receiver.

For each receiver, decision block 835 determines whether a signal is received. If a signal is received, the received channel is recorded as receiving the signature signal from the transmitter specified in block 820, and the power to the occupied channel is turned on in block 845. If a signal is not received, the receive channel is recorded as not receiving the signature signal from the transmitter specified in block 820, and the power to the unoccupied channel is turned off in block 855. When all "M" receivers have been polled, the FOR loop bounded by blocks 830 and 860 is completed. When all "N" transmitters have transmitted a signature signal, the FOR loop bounded by blocks 815 and 865 is completed.

At this point in method 800, the optical links are configured. Each transmitter has transmitted a signature signal, and for each transmitter, all receivers have been polled. Each receiver has been recorded as receiving a signal from a transmitter, or it has been recorded as not receiving a signal. As a result, each transmitter channel assigned an information channel has been paired with at least one receiver.

The actions of method 800 have been described thus far as being applicable to the configuring of a plurality of optical links. The actions of method 800 described thus far are also applicable to re-configuring of optical links, as shown in blocks 870 and 875. In block 870, receivers are monitored for changes. Types of changes include received power level differences, abrupt discontinuities, and the like. These changes can be caused by any type of phenomena such as a failed transmitter, a failed receiver, or a mechanical disturbance that modifies the alignment of fibers. If a change is detected, decision block 875 can cause the previously described actions of method 800 to be repeated, thereby re-configuring the optical links. As a result, different pairings between transmitters and receivers can be made.

The method and apparatus of the present invention provide a mechanism that allow a fiber bundle to be coupled to an array of optical sources and an array of optical receivers without any particular concern about which sources couple to which fibers, and which fibers couple to which receivers. The tolerance for alignment is, therefore, significantly relaxed, and large misalignments can occur while still providing for efficient optical coupling from end to end in the optical interconnect system. The cost of connectors is also significantly reduced.

In summary, the method and apparatus of the present invention provide a mechanism for generating an optical interconnect system having reduced manufacturing tolerances. While we have shown and described specific embodiments of the present invention, further modifications and improvements will occur to those skilled in the art.

We desire it to be understood, therefore, that this invention is not limited to the particular forms shown and we intend in the appended claims to cover all modifications that do not depart from the spirit and scope of this invention.

What is claimed is:

1. An optical link apparatus comprising:

an array of optical sources;

an array of optical receivers; and an optical fiber bundle coupled between the array of optical sources and the array of optical receivers such that a plurality of optical fibers substantially aligns with each of the optical sources.

2. The optical link apparatus of claim 1 wherein each optical source corresponds to at least one optical receiver.

3. The optical link apparatus of claim 1 wherein the array of optical sources comprises a plurality of laser diodes.

4. The optical link apparatus of claim 3 wherein the optical fiber bundle has a length and includes fibers consistently arranged along the length such that a relative placement of fibers in a cross section of fibers coupled to the array of optical sources is substantially the same as a relative placement of fibers in a cross section of fibers coupled to the array of optical receivers.

5. The optical link apparatus of claim 1 wherein the array of optical sources has a density and the array of optical receivers has a density greater than the density of the array of optical sources.

6. The optical link apparatus of claim 5 wherein the optical fiber bundle has a density greater than the density of the array of optical receivers.

7. A fiber optic interconnection system comprising:

a plurality of optical sources;

an optical fiber bundle including a plurality of fibers, the plurality of fibers being greater in number than the plurality of optical sources, the optical fiber bundle having a first end and a second end, the first end being coupled to the plurality of optical sources; and a plurality of optical receivers coupled to the second end.

8. The fiber optic interconnection system of claim 7 wherein the plurality of optical receivers is greater in number than the plurality of optical sources.

9. The fiber optic interconnection system of claim 8 wherein the plurality of optical receivers is less in number than the plurality of fibers, such that each of the plurality of optical sources is configured to illuminate a subset of the plurality of fibers, and at least one fiber of the subset is configured to illuminate at least one of the plurality of optical receivers.

10. The fiber optic interconnection system of claim 7 wherein the plurality of optical receivers are arranged with a density sufficiently great to ensure that light from each of the plurality of optical sources will reach at least one of the plurality of optical receivers through at least one of the plurality of fibers.

11. The fiber optic interconnection system of claim 7 wherein each of the plurality of optical sources is aligned with at least one of the plurality of fibers which is in turn aligned with one of the plurality of optical receivers.

12. The fiber optic interconnection system of claim 7 further including a pixel selection circuit coupled to the plurality of optical receivers such that one or more of the plurality of optical receivers can be associated with one of the plurality of optical sources.

13. The fiber optic interconnection system of claim 12 wherein the pixel selection circuit includes a plurality of switches controllable by a processor.

14. The fiber optic interconnection system of claim 7 wherein the plurality of optical sources are arranged as a plurality of laser diodes having a density, and the plurality of optical receivers are arranged with a density greater than the density of the plurality of laser diodes.

15. A method of performing an optical interconnect comprising:

coupling a first end of a fiber bundle to a plurality of optical sources, each of the plurality of optical sources corresponding to a plurality of fibers in the fiber bundle;

coupling a second end of the fiber bundle to a plurality of optical receivers;

exciting one optical source of the plurality of optical sources; and detecting energy by at least one of the plurality of optical receivers.

16. The method of claim 15 wherein detecting comprises:

detecting energy at more than one optical receiver of the plurality of optical receivers;

comparing an energy level at each of the more than one optical receiver; and selecting one of the more than one optical receiver to pair with the one optical source.

17. The method of claim 16 further comprising:

marking others of the more than one optical receiver as spare receivers for the one optical source.

18. The method of claim 17 further comprising:

when a failure occurs, selecting one of the spare receivers to pair with the one optical source.

19. The method of claim 15 wherein exciting and detecting are repeated for each of the plurality of optical sources.

20. The method of claim 15 wherein detecting comprises:

detecting energy at more than one optical receiver of the plurality of optical receivers, comparing an energy level at each of the more than one optical receiver;

selecting a plurality of the more than one optical receiver to pair with the one optical source; and coupling the plurality of the more than one optical receiver such that signals therefrom sum.

\* \* \* \* \*